(12) United States Patent
Pothen et al.

(10) Patent No.: US 12,359,390 B1
(45) Date of Patent: Jul. 15, 2025

(54) ECO-FRIENDLY NETTING AND SOIL EROSION CONTROL METHOD USING THE SAME

(71) Applicants: Siby Pothen, Ashburn, VA (US); Melissa Pothen, Ashburn, VA (US)

(72) Inventors: Siby Pothen, Ashburn, VA (US); Melissa Pothen, Ashburn, VA (US)

( * ) Notice: Subject to any disclaimer, the term of this patent is extended or adjusted under 35 U.S.C. 154(b) by 0 days.

(21) Appl. No.: 18/217,995

(22) Filed: Jul. 3, 2023

Related U.S. Application Data

(63) Continuation-in-part of application No. 17/493,521, filed on Oct. 4, 2021, now Pat. No. 11,690,329, which
(Continued)

(51) Int. Cl.
*E02D 17/20* (2006.01)
*A01G 20/00* (2018.01)
(Continued)

(52) U.S. Cl.
CPC .......... *E02D 17/202* (2013.01); *A01G 20/00* (2018.02); *B32B 5/028* (2013.01); *B32B 5/073* (2021.05); *B32B 7/12* (2013.01); *B32B 2250/03* (2013.01); *B32B 2250/40* (2013.01); *B32B 2307/54* (2013.01); *B32B 2307/7163* (2013.01); *B32B 2307/718* (2013.01); *B32B 2307/726* (2013.01); *B32B 2410/00* (2013.01); *E02D 2300/0067* (2013.01)

(58) Field of Classification Search
CPC ................................ A01G 20/00; A01G 20/20
See application file for complete search history.

(56) References Cited

U.S. PATENT DOCUMENTS 2,601,620 A * 6/1952 Marshall .................. A01C 1/04
53/550
2,826,865 A * 3/1958 Chohamin ............. A01C 1/044
47/56
(Continued)

FOREIGN PATENT DOCUMENTS

CA 2274886 A1 * 7/1998
CA 2275181 A1 * 7/1998
(Continued)

OTHER PUBLICATIONS

First office action on the merits (Non-Final Rejection) in U.S. Appl. No. 14/918,827, mailed on May 14, 2019.
(Continued)

*Primary Examiner* — Monica L Perry
*Assistant Examiner* — Aaron M Rodziwicz
(74) *Attorney, Agent, or Firm* — The Law Office of Patrick F. O'Reilly III, LLC

(57) ABSTRACT

An eco-friendly netting for soil erosion control includes a netting body portion forming a pattern of netting apertures, the netting body portion being formed from a material that is at least partially biodegradable. The eco-friendly netting is provided as part of an erosion control blanket, where the erosion control blanket further comprises a layer of another material that is attached to the eco-friendly netting. A soil erosion control method includes providing the erosion control blanket with the eco-friendly netting.

18 Claims, 20 Drawing Sheets

Related U.S. Application Data is a continuation-in-part of application No. 16/907,919, filed on Jun. 22, 2020, now Pat. No. 11,134,621, which is a continuation-in-part of application No. 14/918,827, filed on Oct. 21, 2015, now Pat. No. 10,687,483.

(60) Provisional application No. 62/066,946, filed on Oct. 22, 2014.

(51) Int. Cl.
*B32B 5/02* (2006.01)
*B32B 5/06* (2006.01)
*B32B 7/12* (2006.01)

(56) References Cited

U.S. PATENT DOCUMENTS

| | | | | |
|---|---|---|---|---|
| 2,909,003 | A | * 10/1959 | Marshall | A01C 1/044 53/436 |
| 3,863,388 | A | * 2/1975 | Loads | A01G 20/00 47/56 |
| 4,181,450 | A | 1/1980 | Rasen et al. | |
| 4,934,094 | A | 6/1990 | Walton | |
| 5,224,292 | A | 7/1993 | Anton | |
| 5,555,674 | A | 9/1996 | Molnar et al. | |
| 10,993,387 | B1 | * 5/2021 | Tvetene | B66F 9/0755 |
| 2002/0179309 | A1 | * 12/2002 | Woerner | A01G 20/15 172/20 |
| 2003/0000139 | A1 | * 1/2003 | Anderson | A01C 1/044 47/56 |
| 2004/0234725 | A1 | * 11/2004 | Chiang | E02D 17/202 442/205 |
| 2007/0022661 | A1 | * 2/2007 | Slater | A01G 24/25 47/81 |

FOREIGN PATENT DOCUMENTS

| | | | | |
|---|---|---|---|---|
| CN | 201048485 | Y | 4/2008 | |
| CN | 107476166 | A * | 12/2017 | A01G 20/00 |
| EP | 0469422 | A1 | 2/1992 | |
| ES | 2070783 | A1 | 6/1995 | |
| GB | 1367090 | A | 9/1974 | |
| KR | 10-0741715 | B1 | 7/2007 | |
| KR | 10-2011-0053888 | A | 5/2011 | |
| WO | 2004097104 | A2 | 11/2004 | |
| WO | 2005023955 | A2 | 5/2005 | |
| WO | 2010085075 | A2 | 7/2010 | |

OTHER PUBLICATIONS

Second office action on the merits (Final Rejection) in U.S. Appl. No. 14/918,827, mailed on Jan. 8, 2020.
Notice of Allowance in U.S. Appl. No. 14/918,827, mailed on Apr. 20, 2020.
First office action on the merits (Non-Final Rejection) in U.S. Appl. No. 16/907,919, mailed on Feb. 16, 2021.
Notice of Allowance in U.S. Appl. No. 16/907,919, mailed on May 25, 2021.
First office action on the merits (Non-Final Rejection) in U.S. Appl. No. 17/493,521, mailed on Nov. 1, 2022.
Notice of Allowance in U.S. Appl. No. 17/493,521, mailed on Feb. 16, 2023.

* cited by examiner

Section A-A

ECO-FRIENDLY NETTING AND SOIL EROSION CONTROL METHOD USING THE SAME

CROSS-REFERENCE TO RELATED APPLICATIONS

This patent application is a continuation-in-part of U.S. patent application Ser. No. 17/493,521, entitled "Eco-Friendly Netting and Methods of Growing and Harvesting Sod Using the Same", filed on Oct. 4, 2021; which is a continuation-in-part of U.S. patent application Ser. No. 16/907,919, entitled "Eco-Friendly Netting and Methods of Growing and Harvesting Sod Using the Same", filed on Jun. 22, 2020, now U.S. Pat. No. 11,134,621; which is a continuation-in-part of U.S. patent application Ser. No. 14/918,827, entitled "Eco-Friendly Netting and Methods of Growing and Harvesting Sod Using the Same", filed on Oct. 21, 2015, now U.S. Pat. No. 10,687,483, and further claims the benefit of U.S. Provisional Patent Application No. 62/066,946, entitled "Eco-Friendly Netting and Methods of Growing and Harvesting Sod Using the Same", filed on Oct. 22, 2014, the disclosure of each of which is hereby incorporated by reference as if set forth in their entireties herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to an eco-friendly netting. More particularly, the invention relates to an eco-friendly netting for soil erosion control, growing and/or harvesting sod, plants, and/or any type of vegetation.

2. Background

Traditional plastic turf netting is known and used in various applications, such as for sod reinforcement while the grass forming the sod is being grown. While plastic turf netting is capable of reinforcing the sod during the growth period, it has many deleterious effects on the environment. For example, traditional plastic turf netting is not biodegradable, and thus remains buried in the ground for many years. The buried plastic can leach toxic chemicals that can permeate through the soil and contaminate ground water. Although there are some varieties of plastic turf netting that claim to be degradable, these nettings essentially disintegrate under ultraviolet radiation and can still leach toxic chemicals, eventually contaminating the ground water. In addition, conventional plastic turf netting often becomes entangled in grass mowing equipment, thereby damaging the equipment and the root system. Also, traditional plastic turf netting poses a substantial threat to wildlife because various types of animals can become easily entangled in this artificial netting product. Finally, because conventional plastic turf netting is extremely lightweight, it is readily susceptible to being undesirably displaced by the wind, thereby preventing the turf netting from performing its intended functionality.

Therefore, what is needed is an eco-friendly alternative to traditional plastic turf netting for soil erosion control, sod growers and harvesters that does not have the negative environmental impacts of conventional plastic netting. Moreover, eco-friendly netting is needed that significantly reduces the chances of netting entanglement in grass mowing equipment and the threat of wildlife entrapment. Furthermore, there is a need for eco-friendly netting that is heavier than conventional plastic netting so as to greatly reduce the likelihood that the netting will be displaced by natural forces acting thereon, such as that of wind-induced forces. In addition, there is a need for eco-friendly netting that is derived from natural and organic plant materials that can biodegrade without the need for exposure to ultraviolet radiation.

BRIEF SUMMARY OF EMBODIMENTS OF THE INVENTION

Accordingly, the present invention is directed to eco-friendly netting and a soil erosion control method using the same that substantially obviates one or more problems resulting from the limitations and deficiencies of the related art.

In accordance with one or more embodiments of the present invention, there is provided an eco-friendly netting for soil erosion control. The eco-friendly netting includes a netting body portion forming a pattern of netting apertures, the netting body portion being formed from a material that is at least partially biodegradable.

In a further embodiment of the present invention, the netting is provided as part of an erosion control blanket, the erosion control blanket further comprising a layer of another material that is attached to the netting.

In yet a further embodiment, the netting is provided on one side of the layer of another material.

In still a further embodiment, the netting is provided above and below the layer of another material so as to form both a bottom layer and a top layer of the erosion control blanket with the layer of another material forming a central layer sandwiched between the top and bottom layers.

In yet a further embodiment, the layer of another material of the erosion control blanket is selected from the group consisting of: (i) straw, (ii) coir, (iii) polypropylene, (iv) hemp, (v) jute, (vi) any natural fiber, (vii) any synthetic fiber, and (viii) any combinations thereof.

In still a further embodiment, the layer of another material is attached to the netting by at least one of: (i) stitch-bonding, (ii) needle felting, (iii) gluing, and (iv) combinations thereof.

In yet a further embodiment, the material forming the netting body portion is configured to decompose without requiring exposure to ultraviolet radiation.

In still a further embodiment, the material forming the netting body portion is configured to absorb water so as to increase a weight of the material and release the absorbed water back to a root system in adjacent soil.

In yet a further embodiment, the material forming the netting body portion is configured to release nutrients to the soil as the material decomposes.

In still a further embodiment, the material forming the netting body portion is selected from the group consisting of: (i) one or more plant-based fibers, (ii) one or more agricultural by-products, (iii) one or more organic materials, (iv) one or more inorganic materials, (v) one or more bioplastics, and (v) combinations thereof.

In yet a further embodiment, the material forming the netting body portion comprises a plurality of fibers or yarns arranged in a woven configuration, a knitted configuration, a substantially non-woven configuration, or an extruded configuration, and each of the plurality of fibers or yarns is formed from a substantially natural or biodegradable material.

In still a further embodiment, the substantially natural or biodegradable material comprises jute, hemp, coir, cotton and/or bioplastics.

In yet a further embodiment, the netting has a mass per unit area of less than 300 grams per square meter.

In still a further embodiment, the netting apertures are formed in the netting body portion by: (i) weaving, (ii) knitting, (iii) needle-punching, or (iv) extrusion, and each of the netting apertures has an opening size of at least 0.8 millimeters by at least 0.8 millimeters.

In yet a further embodiment, the netting is treated or processed to increase a functional longevity of the netting, and the netting has a longevity of between approximately 3 months and approximately 60 months, inclusive.

In still a further embodiment, the netting has a longitudinal wide width strip tensile strength of less than 2500 pounds per foot, and the netting has a transversal wide width strip tensile strength of less than 2500 pounds per foot.

In yet a further embodiment, the netting is pre-seeded.

In still a further embodiment, the netting is treated or processed with at least one of anti-rot agents, degrading accelerators, degrading inhibitors, nutrients, pesticides, fungicides, algaecides, herbicides, water absorption enhancers, water retention enhancers, water repellent enhancers, or any combination thereof.

In accordance with one or more other embodiments of the present invention, there is provided a soil erosion control method using an eco-friendly netting. The method comprising the steps of: (i) providing an erosion control blanket that includes an eco-friendly netting, the eco-friendly netting including a netting body portion forming a pattern of netting apertures, the netting body portion being formed from a material that is at least partially biodegradable; (ii) loosening a top portion of a soil area to prepare the soil area for a planting of seeds; (iii) applying a plurality of seeds to the soil area such that the plurality of seeds are embedded in the soil area; (iv) unrolling and arranging a plurality of strips of the erosion control blanket on a top of the soil area in an overlapping manner; (v) anchoring a plurality of outer edges of the plurality of the erosion control blanket strips into the ground so as to retain the erosion control blanket in place; and (vi) irrigating the plurality of seeds in the soil area so that vegetation grows in the soil area.

In a further embodiment of the present invention, the method further comprises the step of: (vii) applying at least one of additional seeding, irrigation, fertilizers, soil amendments, and herbicides to the plurality of seeds in the soil area.

It is to be understood that the foregoing general description and the following detailed description of the present invention are merely exemplary and explanatory in nature.

As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same elements are always denoted using the same reference characters so that, as a general rule, they will only be described once.

DETAILED DESCRIPTION OF EMBODIMENTS OF THE INVENTION

Figure 1:
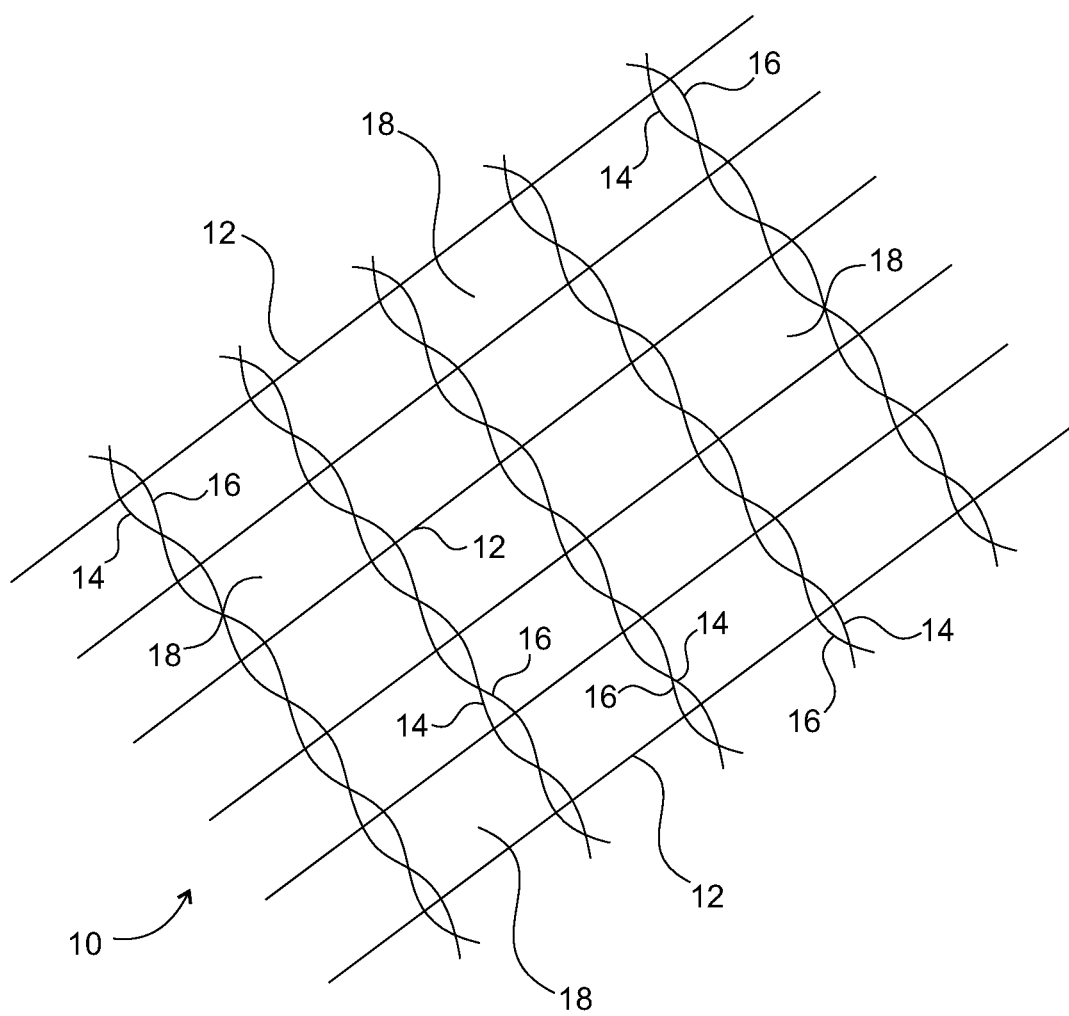
FIG. 1 is a perspective view of a first type of eco-friendly netting used in the growing and harvesting of sod, plants, and any type of vegetation, according to an embodiment of the invention.

Referring initially to FIG. 1, it can be seen that, in an illustrated embodiment, the eco-friendly netting 10 may comprise a plurality of weft yarns 12 with a plurality of pairs of warp yarns 14, 16 that are twisted around the weft yarns 12 in order to form netting material having a grid-like pattern. As shown in the illustrated embodiment of FIG. 1, the grid-like pattern of the eco-friendly netting 10 defines a plurality of substantially rectangular netting apertures 18 formed by the intertwined weft yarns 12 and warp yarns 14, 16. In FIG. 1, it can be seen that the netting apertures 18 of the eco-friendly netting 10 are generally arranged in a grid-like configuration.

Figure 9:
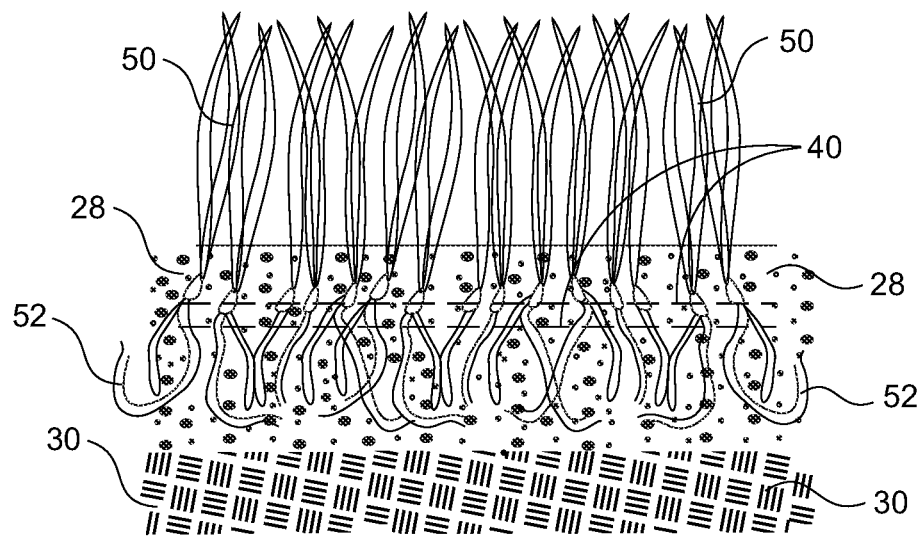
FIG. 9 is a illustrative view depicting roots of grass in the sod being intertwined with the eco-friendly netting in the exemplary sod growing method.

One suitable application for the eco-friendly netting described herein is illustrated in FIG. 9. In this figure, it can be seen that strips 40 of the eco-friendly netting 10 are being used in the process of growing sod. More particularly, the strips 40 of the eco-friendly netting 10 are positioned in the topsoil bed 28 at the base of the sod so that the roots 52 of the grass 50 may become intertwined therein. As described hereinafter, the eco-friendly netting 10 is also particularly well-suited for harvesting sod.

In one or more embodiments, the eco-friendly netting 10 includes a plurality of fibers or yarns arranged in a woven configuration or a substantially non-woven configuration. The substantially non-woven configuration may comprise a large portion of fibers or yarns that are non-woven and a small portion of fibers or yarns that are woven (i.e., the substantially non-woven configuration is mostly comprised of non-woven fibers or yarns, but may contain some woven fibers or yarns). Alternatively, the substantially non-woven configuration may be entirely comprised of non-woven fibers or yarns. For example, in one or more embodiments, the substantially non-woven configuration of the netting 10 may be formed from a fibrous sheet, similar to a piece of felt, and the netting apertures described hereinafter may be punched into the fibrous sheet. Each of the plurality of fibers or yarns is formed from a substantially natural material or an entirely natural material. The substantially natural material may be mostly formed from a natural material (e.g., jute, hemp, coir (coconut fiber), and/or cotton), but may also contain a small amount of an unnatural material (e.g., conventional plastic). Alternatively, the substantially natural material may be entirely comprised of a natural material. Advantageously, the utilization of a substantially natural material for the plurality of netting fibers or yarns provides an eco-friendly, reliable and better performing alternative to conventional plastic netting, while significantly reducing both the chances of netting entanglement in grass mowing equipment and the threat of wildlife entrapment. In some embodiments, the substantially natural material forming the eco-friendly netting 10 may comprise a combination of jute and cotton fibers. As one non-limiting example, the eco-friendly netting 10 may contain 80% by weight of jute fibers and 20% by weight of cotton fibers. Also, the substantially natural material forming the eco-friendly netting 10 may be configured to naturally absorb water so as to increase a weight of the material so that the netting 10 is more likely to remain in place when being used (i.e., the netting 10 will be less likely to be blown out of place by wind, etc.). As one non-limiting example, the eco-friendly netting 10 may absorb 100% to 300% by weight of water. The absorption of water by the netting 10 allows it to "hug" the soil. By virtue of its unique, interwoven, twisted construction, the netting 10 is stronger, and has superior dimensional stability and adherence to the soil during the initial stages of planting and during harvesting. The netting may have a weight that is greater than a netting formed from a conventional plastic or another polymeric material used for sod growing (e.g., the netting have a weight that is 200% to 600% more than conventional plastic netting). The netting 10 may also include seeds and/or fertilizers and/or water absorbing materials. For example, the netting 10 may comprise seeds, such as Fescue, Rye, Bluegrass, Bermuda, *Zoysia*, Centipede, etc. Also, as an example, the netting 10 may comprise fertilizers containing pre-determined proportions of Nitrogen, Phosphorous and Potassium and/or water absorbing materials comprising Hydrophilic crystalline polymers. In one or more embodiments, the netting 10 is pre-seeded prior to installation (e.g., pre-seeded with grass seeds). For example, an adhesive medium may be used to bond the seeds to the netting 10. As it is used throughout this disclosure, the conjunction "and/or" means one, or the other, or both (e.g., when it is said that the netting 10 may comprise jute and/or cotton fibers, this means that the netting 10 may comprise jute fibers without cotton fibers, the netting 10 may comprise cotton fibers without jute fibers, or that the netting 10 may comprise both jute and cotton fibers). Also, throughout this disclosure, dimensional quantities in millimeters are abbreviated "mm".

In one or more embodiments, the eco-friendly netting 10 may be heavy enough to stay in place when typical wind forces are acting thereon during the installation thereof. For example, the eco-friendly netting 10 may be 200% to 600% heavier than conventional plastic netting.

In some embodiments, the substantially natural material forming the eco-friendly netting 10 may comprise an entirely natural material comprised of completely organic, non-synthetic fibers or yarns from a renewable resource. In these embodiments, the plurality of fibers forming the eco-friendly netting 10 do not comprise a conventional polymeric material or plastic. Thus, the negative environmental impact resulting from the use of conventional plastic is eliminated. Also, the plurality of fibers or yarns forming the eco-friendly netting 10 may have attractive earthen tones with no chemicals or dyes. When provided with an aesthetically pleasing, natural earthen color, the netting 10 may blend in with the roots and the soil of the sod. For example, the natural earthen color of the netting 10 may comprise sand, honey, or taupe color tones. Advantageously, when the netting 10 is provided with a natural earthen color, the netting 10 is undyed and unbleached.

Figure 2:
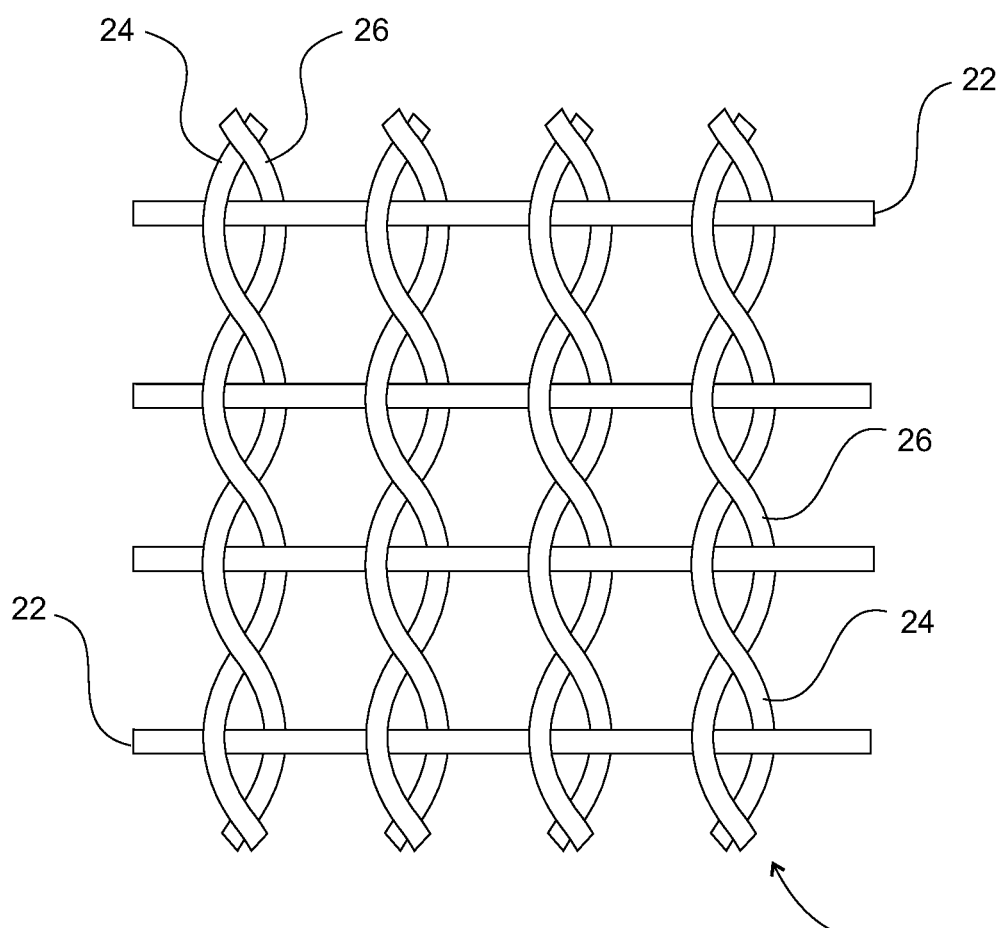
FIG. 2 is an illustrative view of an exemplary leno weave used in conjunction with embodiments of the eco-friendly netting described herein.

In some embodiments, such as that illustrated in FIG. 1, the plurality of fibers forming the eco-friendly netting 10 are arranged in an interwoven, twisted configuration. The interwoven, twisted configuration in which the plurality of netting fibers or yarns are arranged may comprise either a leno weave or a basket weave (i.e., the woven fabric plies may comprise either a leno weave or a basket weave). Advantageously, the use of a leno weave or a basket weave results in a stronger netting material. For example, as illustrated in FIG. 2, an exemplary leno weave 20 may comprise two (2) warp yarns 24, 26 that are twisted around weft yarns 22 in order to provide a strong netting material. Advantageously, the leno weave produces an open fabric with virtually no yarn slippage or misplacement of threads. That is, when a leno weave is used, each weft yarn is held in place by one (1) warp yarn above and one (1) warp yarn below. The warp yarn running above a weft yarn runs below the adjacent weft yarns, and a warp yarn running below a weft yarn runs above the adjacent weft yarns, thereby creating a twist and lock effect, which results in excellent dimensional stability.

In one or more embodiments, the eco-friendly netting 10 is constructed in a leno weave with warp and weft of jute yarns having a thickness between approximately 0.5 millimeters (mm) and approximately 1.5 millimeters (mm), inclusive (or between 0.5 mm and 1.5 mm, inclusive), a mesh aperture size of between approximately 50.0 mm by 30.0 mm and approximately 20.0 mm by 10.0 mm (or between 50.0 mm by 30.0 mm and 20.0 mm by 10.0 mm), and a mass per unit area of between approximately 20 grams per square meter and approximately 40 grams per square meter, inclusive (or between 20 grams per square meter and 40 grams per square meter, inclusive). The mesh aperture sizes listed above are given in terms of length by width of the mesh opening.

In one or more other embodiments, the eco-friendly netting 10 is constructed in a leno weave with warp and weft of jute yarns having a thickness between approximately 0.5 mm and approximately 1.5 mm, inclusive (or between 0.5 mm and 1.5 mm, inclusive), a mesh aperture size of between approximately 25.0 mm by 15.0 mm and approximately 10.0 mm by 8.0 mm (or between 25.0 mm by 15.0 mm and 10.0 mm by 8.0 mm), and a mass per unit area of between approximately 40 grams per square meter and approximately 60 grams per square meter, inclusive (or between 40 grams per square meter and 60 grams per square meter, inclusive). The mesh aperture sizes listed above are given in terms of length by width of the mesh opening.

Figure 13:
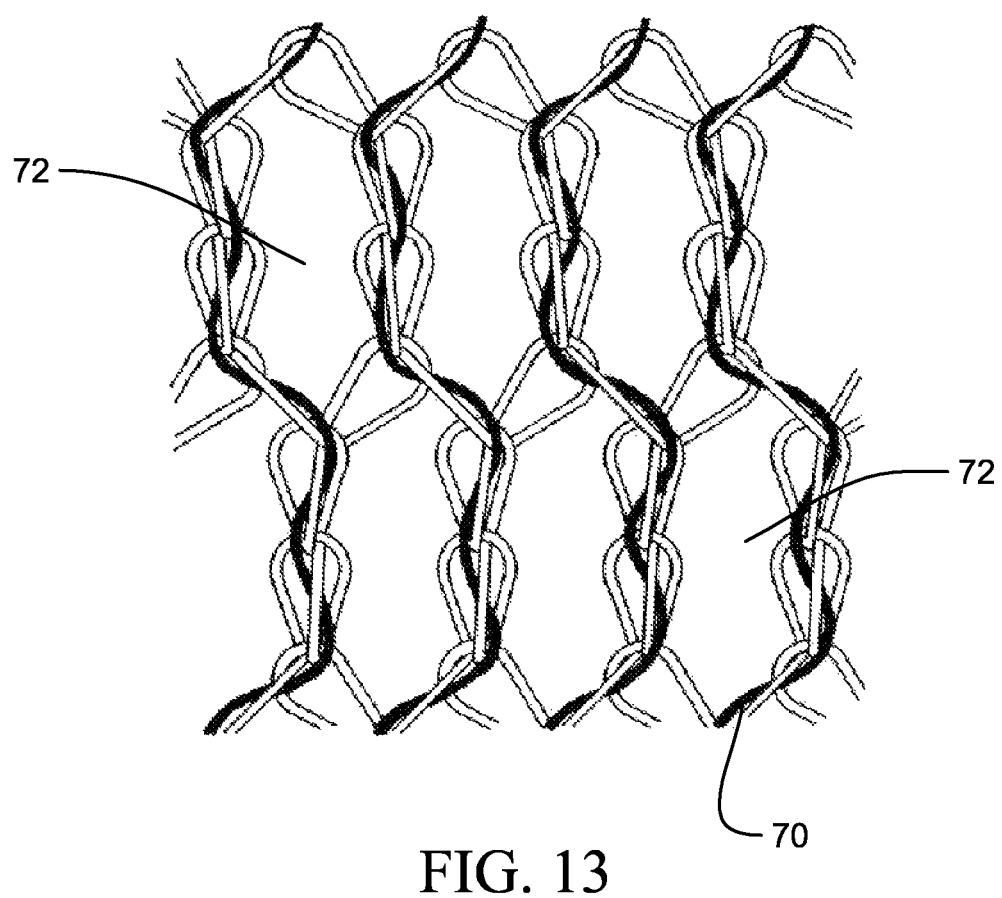
FIG. 13 is a perspective view of a second type of eco-friendly netting used in the growing and harvesting of sod, plants, and any type of vegetation, according to another embodiment of the invention.
Figure 14:
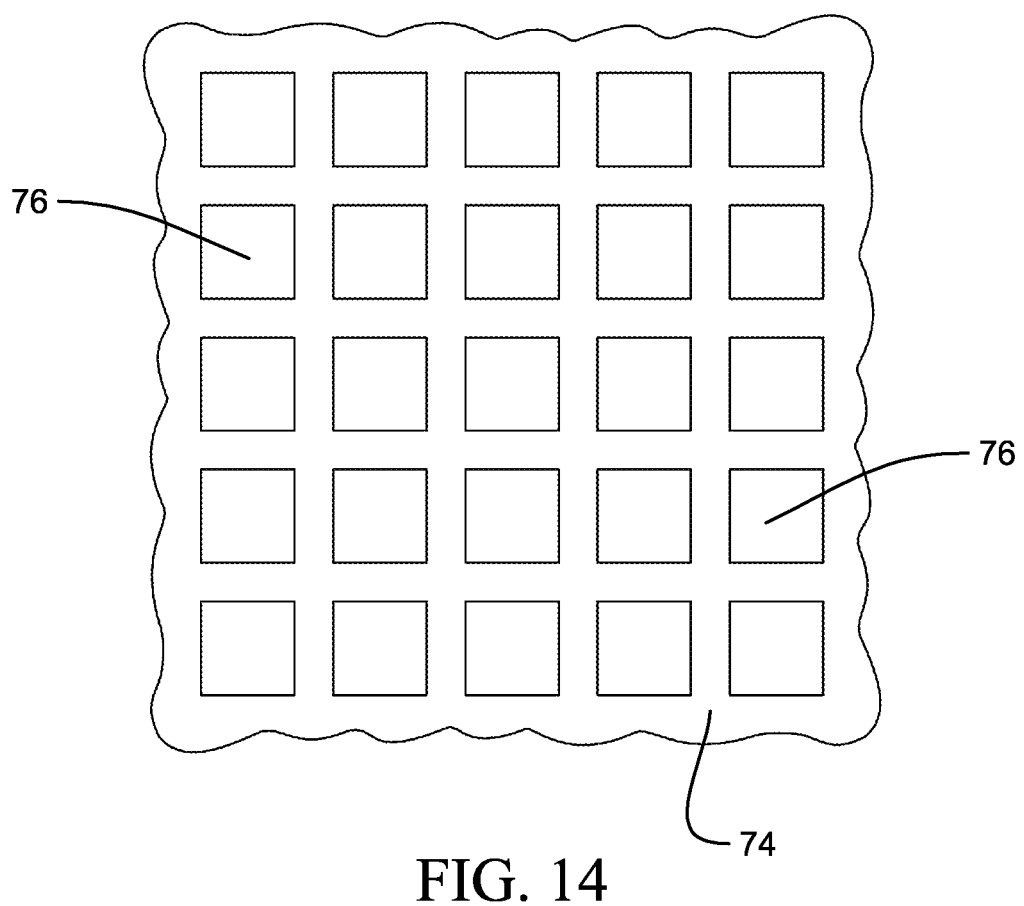
FIG. 14 is a perspective view of a third type of eco-friendly netting used in the growing and harvesting of sod, plants, and any type of vegetation, according to another embodiment of the invention.
Figure 15:
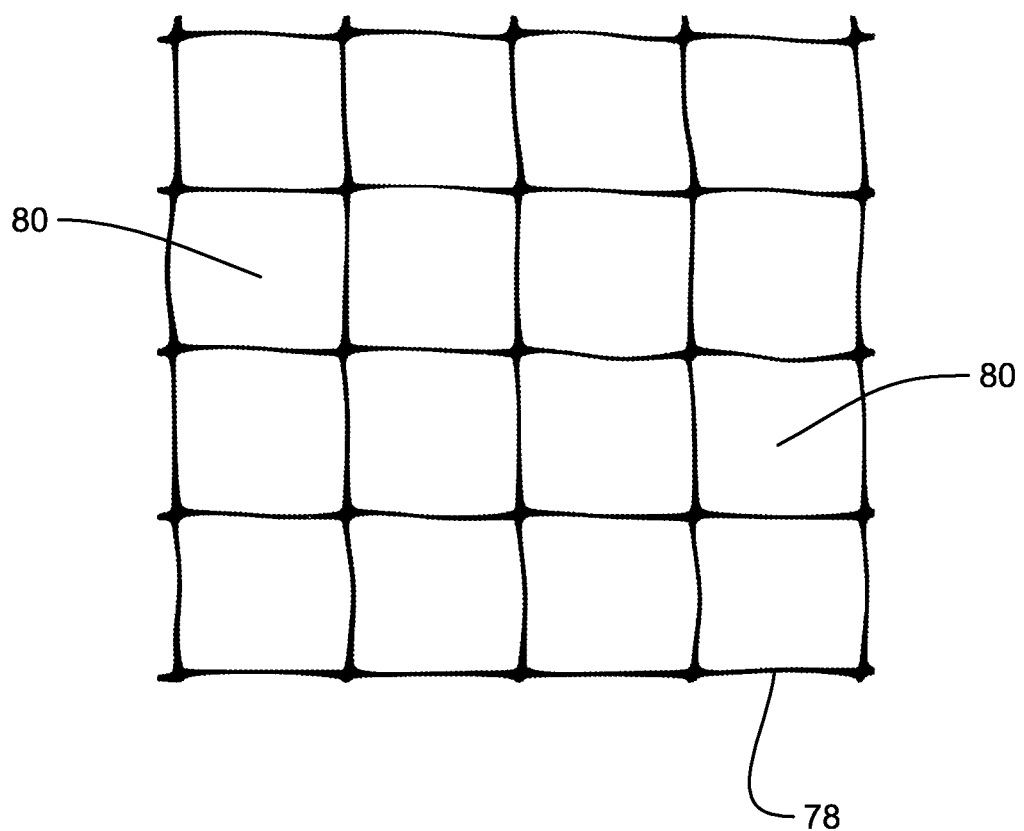
FIG. 15 is a perspective view of a fourth type of eco-friendly netting used in the growing and harvesting of sod, plants, and any type of vegetation, according to yet another embodiment of the invention.
Figure 16:
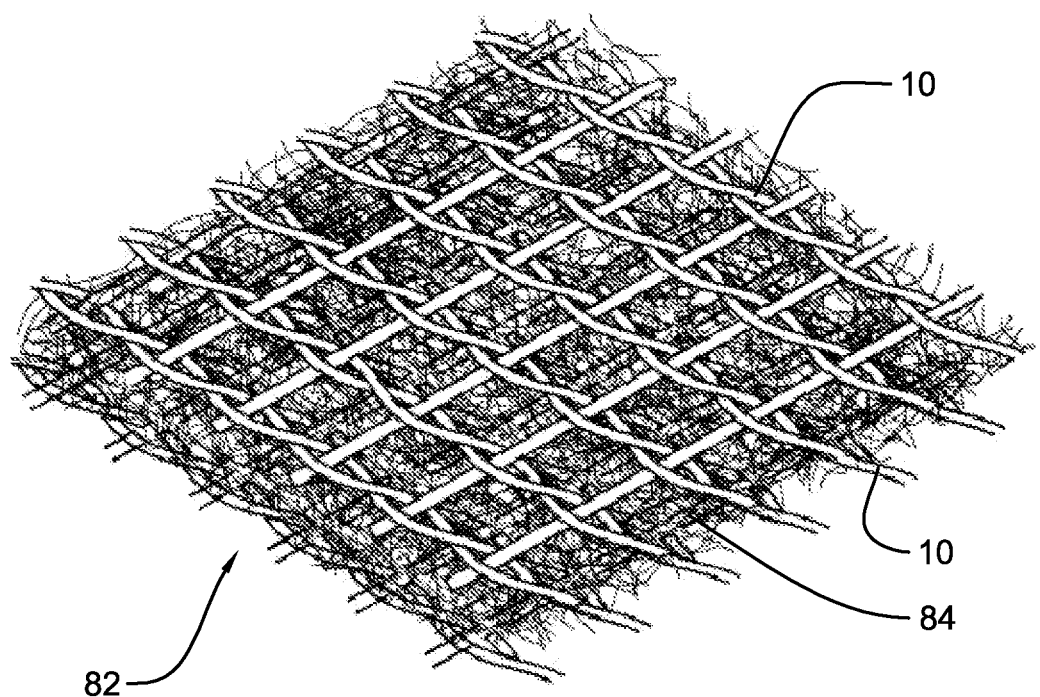
FIG. 16 is an assembled perspective view of an erosion control blanket comprising eco-friendly netting used in soil erosion control, according to still another embodiment of the invention.
Figure 17:
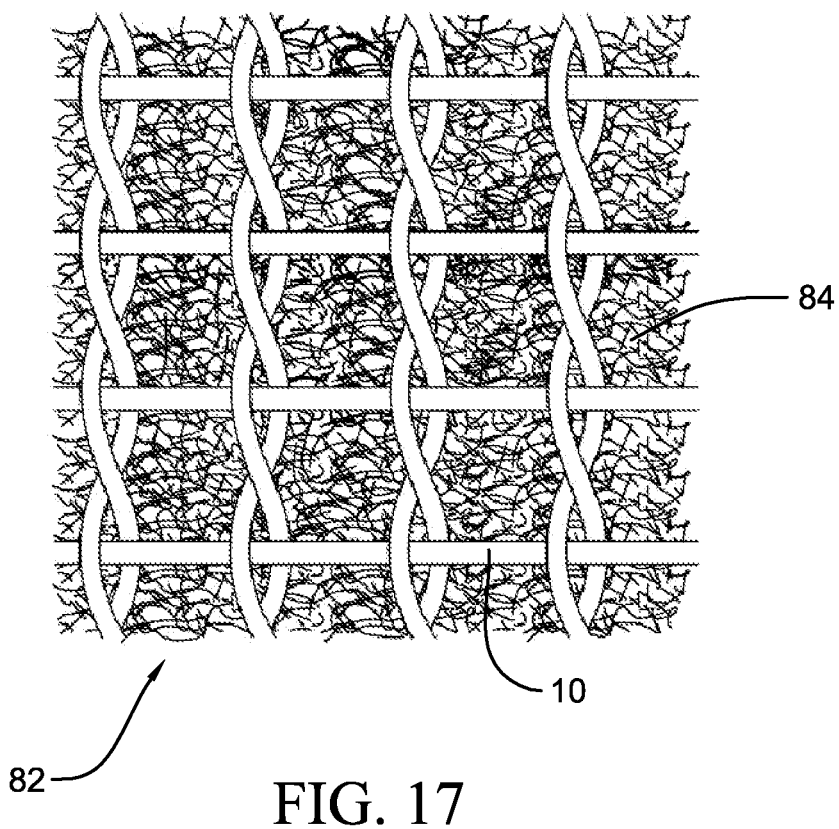
FIG. 17 is a top plan view of the erosion control blanket of FIG. 16.
Figure 18:
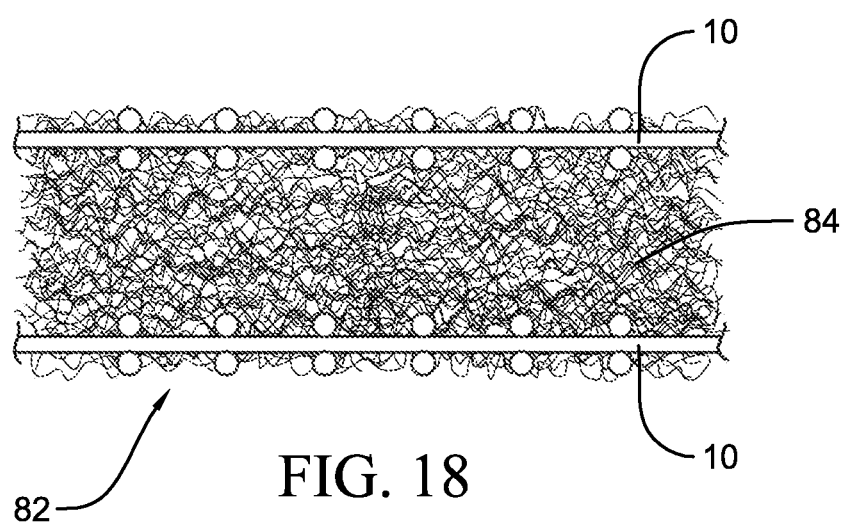
FIG. 18 is a side elevational view of the erosion control blanket of FIG. 16.
Figure 19:
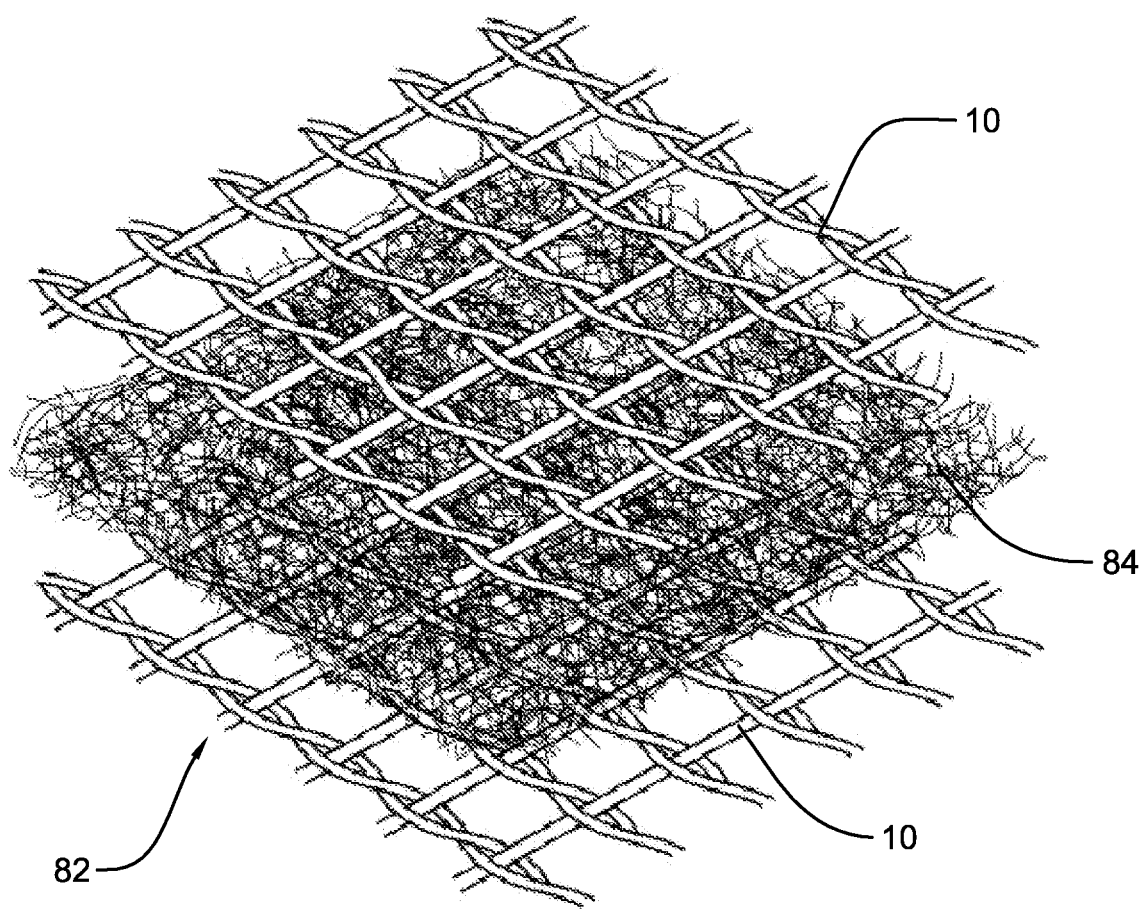
FIG. 19 is an exploded perspective view of the erosion control blanket of FIG. 16.

In one or more embodiments, the eco-friendly netting may comprise a netting body portion forming a pattern of netting apertures. The material forming the netting body portion may comprise a plurality of fibers or yarns arranged in a woven configuration (see e.g., FIGS. 1 and 2), a knitted configuration 70 with netting apertures 72 (see e.g., FIG. 13), a substantially non-woven configuration 74 with punched netting apertures 76 (see e.g., FIG. 14), or an extruded configuration 78 with netting apertures 80 (see e.g., FIG. 15). As such, the netting apertures may be formed in the netting body portion by: (i) weaving, (ii) knitting, (iii) needle-punching, or (iv) extrusion. In one or more embodiments, each of the netting apertures may have an opening size of at least approximately 0.8 mm by approximately 0.8 mm (or at least 0.8 mm by 0.8 mm). For example, in one exemplary embodiment, each of the netting apertures may have an opening size of between approximately 50.0 mm by 50.0 mm and approximately 0.8 mm by 0.8 mm (or between 50.0 mm by 50.0 mm and 0.8 mm by 0.8 mm), inclusive of all values within the range and the endpoints of the range.

In one or more other embodiments, turning to FIGS. 16-19, the eco-friendly netting 10 may be provided as part of an erosion control blanket 82, where the erosion control blanket 82 further comprises a layer of another material 84 that is attached to the netting 10. As shown in the illustrative embodiment of FIGS. 16-19, the netting 10 may be provided above and below the layer of another material 84 so as to form both a bottom layer and a top layer of the erosion control blanket 82 with the layer of another material 84 forming a central layer sandwiched between the top and bottom layers. In an alternative embodiment, the netting 10 may be provided on just one side of the layer of another material 84.

In the illustrative embodiment, the layer of another material 84 of the erosion control blanket 82 is selected from the group consisting of: (i) straw, (ii) coir (coconut fiber), (iii) polypropylene, (iv) hemp, (v) jute, (vi) any natural fiber, (vii) any synthetic fiber, and (viii) any combinations thereof. In the illustrative embodiment, the layer of another material 84 of the erosion control blanket 82 is attached to the netting 10 by at least one of: (i) stitch-bonding, (ii) needle felting, (iii) gluing, and (iv) combinations thereof.

In one or more other embodiments, the eco-friendly netting 10 may be treated or processed to increase a functional longevity of the netting 10 such that the netting 10 has a longevity of between approximately 3 months and approximately 60 months, inclusive. For example, to increase its functional longevity when used for soil erosion control, the netting 10 may be treated with durability enhancement materials (e.g., plant based oils and/or hydrophobic materials) and/or durability enhancement methods (e.g., heat treatment and/or esterification) may be used.

In one or more embodiments, the netting body portion may have a longitudinal wide width strip tensile strength of less than 2500 pounds per foot, and a transverse wide width strip tensile strength of less than 2500 pounds per foot, according to a test performed in accordance with ASTM Standard D 4595 (Standard Test Method for Tensile Properties of Geotextiles by the Wide-Width Strip Method).

In one or more embodiments, the netting body portion may be formed from a material that is partially or fully biodegradable. For example, in one or more embodiments, the partially or fully biodegradable material forming the netting body portion is selected from the group consisting of: (i) one or more plant-based fibers, (ii) one or more agricultural by-products, (iii) one or more organic materials, (iv) one or more inorganic materials, (i) one or more bioplastics, and (v) combinations thereof.

In one or more embodiments, the plurality of fibers forming the eco-friendly netting 10 may be substantially biodegradable, and may be configured to decompose without requiring exposure to ultraviolet (UV) radiation (i.e., without direct exposure to the rays of the sun). The substantially biodegradable netting 10 may comprise mostly biodegradable fibers, but may contain some fibers that are not biodegradable. Alternatively, the substantially biodegradable netting 10 may comprise entirely biodegradable fibers. The plurality of netting fibers or yarns may be configured to release nutrients to the soil as the fibers or yarns decompose so as to enhance the growth of grass in a sod growing application. In some embodiments, the netting 10 may have a longevity of between approximately 1 month and approximately 60 months, inclusive (or a longevity between 1 month and 60 months, inclusive). In some other embodiments, the netting 10 may have a longevity of between approximately 1 month and approximately 24 months, inclusive (or a longevity between 1 month and 24 months, inclusive). For the sod harvesting application, it is desirable that that the netting biodegrades rather quickly after the harvested sod is installed in place. As such, for the sod harvesting application, the longevity may be closer to the lower end of the exemplary longevity ranges listed above. In the sod growing application, the netting must remain structurally intact and be able to hold the root structure together until it is ready to harvest. Thus, for the sod growing application, the longevity may be closer to the upper end of the exemplary longevity ranges listed above. This could be one growing season to several growing seasons. Some varieties of grass in certain climatic conditions require an even longer time to grow and mature. The ecofriendly netting used in such applications requires an even longer longevity. In one or more embodiments, the eco-friendly netting 10 may be treated or processed to increase or decrease its functional longevity. For example, the netting 10 may be treated with a rot-resistant additive.

In one or more embodiments, the eco-friendly netting 10 is treated or processed with anti-rot agents, degrading accelerators, degrading inhibitors, nutrients, pesticides, fungicides, algaecides, herbicides (weed killers), water absorption/retention enhancers, water repellent enhancers, or any combination thereof.

In one or more embodiments, the eco-friendly netting 10 may have a yarn thickness of between approximately 0.1 millimeters and approximately 2.0 millimeters, inclusive (or between 0.1 millimeters and 2.0 millimeters, inclusive). More specifically, in one or more embodiments, the eco-friendly netting 10 may have a yarn thickness of between approximately 0.5 millimeters and approximately 1.5 millimeters, inclusive (or between 0.5 millimeters and 1.5 millimeters, inclusive). For example, if a cotton thread is used for the yarn of the eco-friendly netting 10, the yarn thickness may be closer to the lower end of the range (e.g., approximately 0.1 millimeters). The netting 10 may also have a mass per unit area of less than 100 grams per square meter (gsm). More specifically, in one or more exemplary embodiments, the eco-friendly netting 10 may have a mass per unit area of between approximately 20 grams per square meter (gsm) and 40 grams per square meter (gsm), inclusive (or between 20 gsm and 40 gsm, inclusive). In one or more other exemplary embodiments, the eco-friendly netting 10 may have a mass per unit area of between approximately 40 grams per square meter (gsm) and 60 grams per square meter (gsm), inclusive (or between 40 gsm and 60 gsm, inclusive). In addition, the netting may have a longitudinal wide width strip tensile strength of less than 500 pounds per foot, and a transverse wide width strip tensile strength of less than 500 pounds per foot, according to a test performed in accordance with ASTM Standard D 4595 (Standard Test Method for Tensile Properties of Geotextiles by the Wide-Width Strip Method). More specifically, in one or more exemplary embodiments, the eco-friendly netting 10 may have a longitudinal wide width strip tensile strength of between approximately 20 pounds per foot and approximately 300 pounds per foot, inclusive (or between 20 pounds per foot and 300 pounds per foot, inclusive), and a transverse wide width strip tensile strength of between approximately 20 pounds per foot and approximately 300 pounds per foot, inclusive (or between 20 pounds per foot and 300 pounds per foot, inclusive), according to a test performed in accordance with ASTM Standard D 4595 (Standard Test Method for Tensile Properties of Geotextiles by the Wide-Width Strip Method). The tensile strength of the eco-friendly netting 10 needs to be adequate to hold the root system together and to carry the weight of the mature sod during harvesting and installation.

As mentioned above, in one or more embodiments, the eco-friendly netting 10 may have a plurality of fibers or yarns that form a pattern of netting apertures 18 (see FIG. 1). Each of the netting apertures 18 may have an opening size of at least approximately 6.0 mm by approximately 6.0 mm (or at least 6.0 mm by 6.0 mm). For example, in one exemplary embodiment, the netting apertures 18 may have a mesh aperture size of between approximately 50.0 mm by 30.0 mm and approximately 20.0 mm by 10.0 mm. In another exemplary embodiment, the netting apertures 18 may have a mesh aperture size of between approximately 25.0 mm by 15.0 mm and approximately 10.0 mm by 8.0 mm. Opening sizes in these exemplary ranges provide enough open area for the grass to grow unobstructed.

The netting 10 may have a water retention percentage of 100 to 300 percent. Advantageously, unlike traditional plastic netting, the eco-friendly netting can absorb water and release it back to the root system. This creates an ideal microclimate for the healthy root development.

Figure 3:
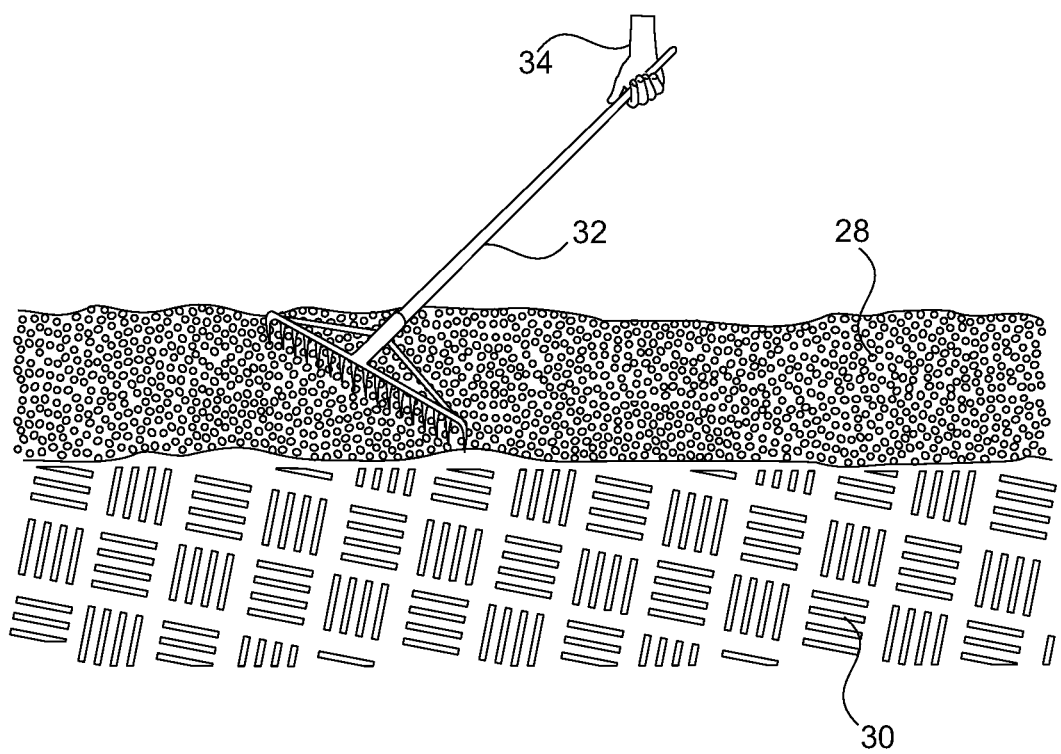
FIG. 3 is an illustrative view depicting the loosening of a topsoil bed in an exemplary sod growing method that utilizes the eco-friendly netting described herein.
Figure 4:
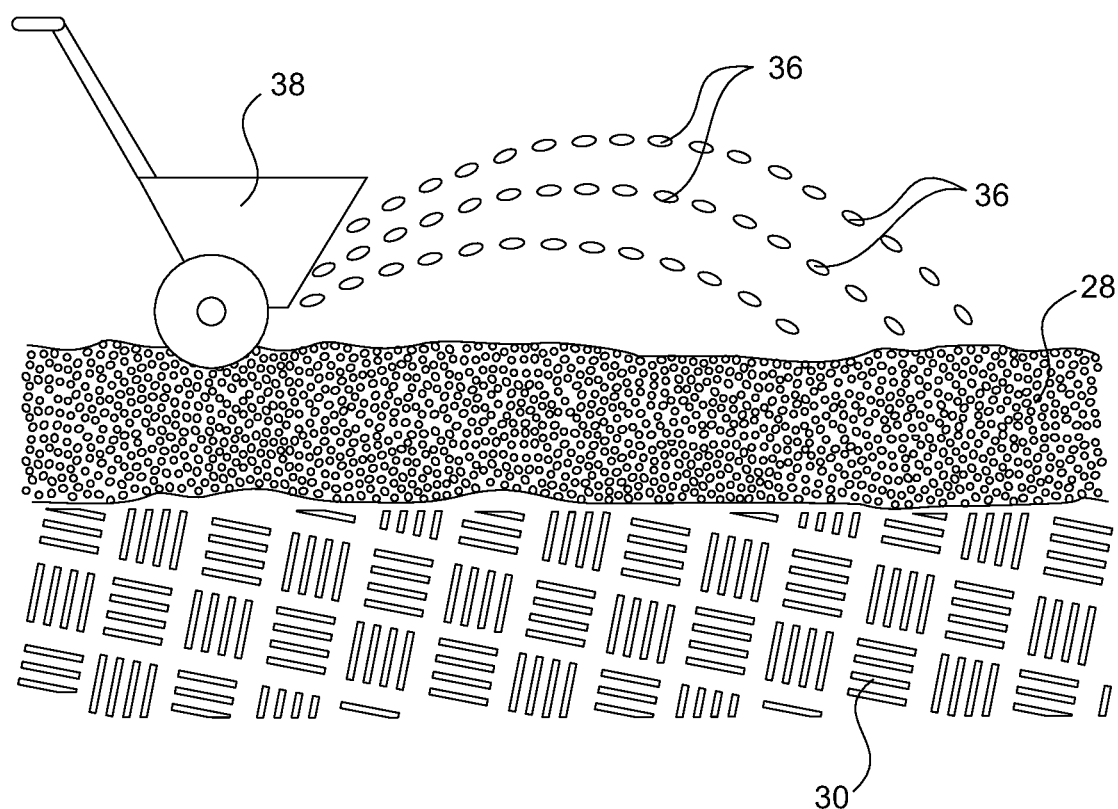
FIG. 4 is an illustrative view depicting the application of grass seeds to the topsoil bed in the exemplary sod growing method.
Figure 5:
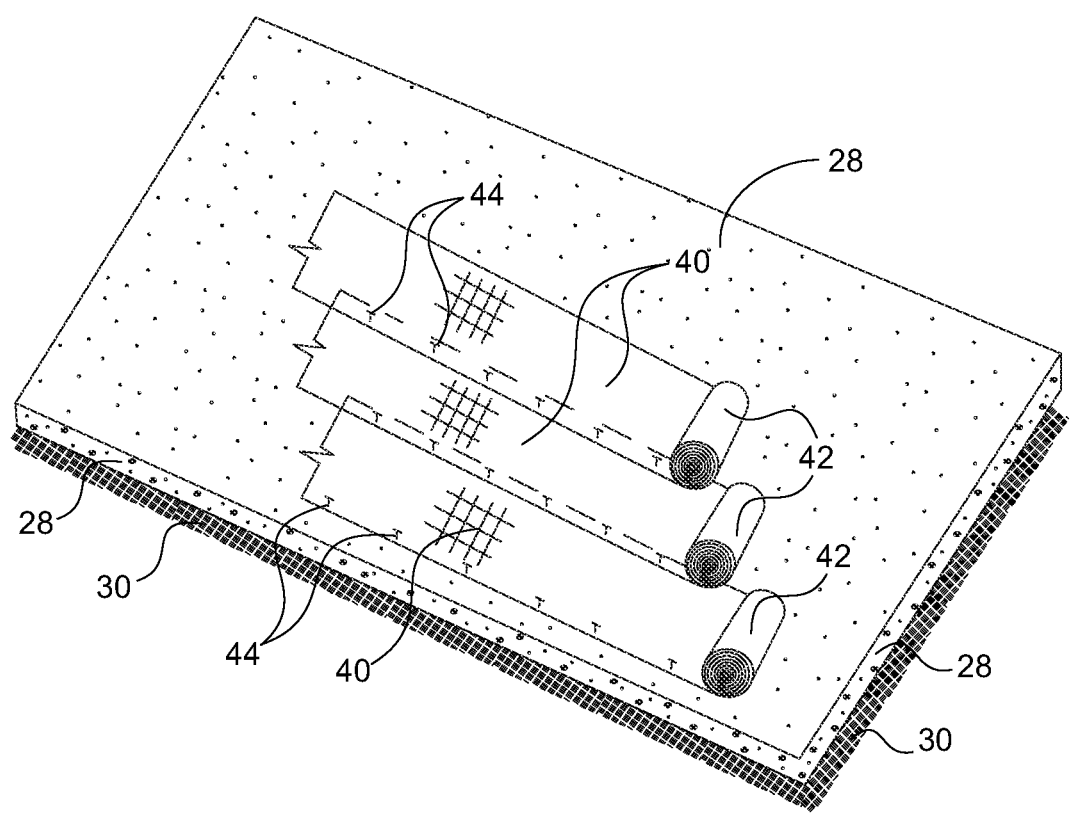
FIG. 5 is an illustrative view depicting the placement of a plurality of overlapping strips of the eco-friendly netting on the topsoil bed in the exemplary sod growing method.
Figure 6:
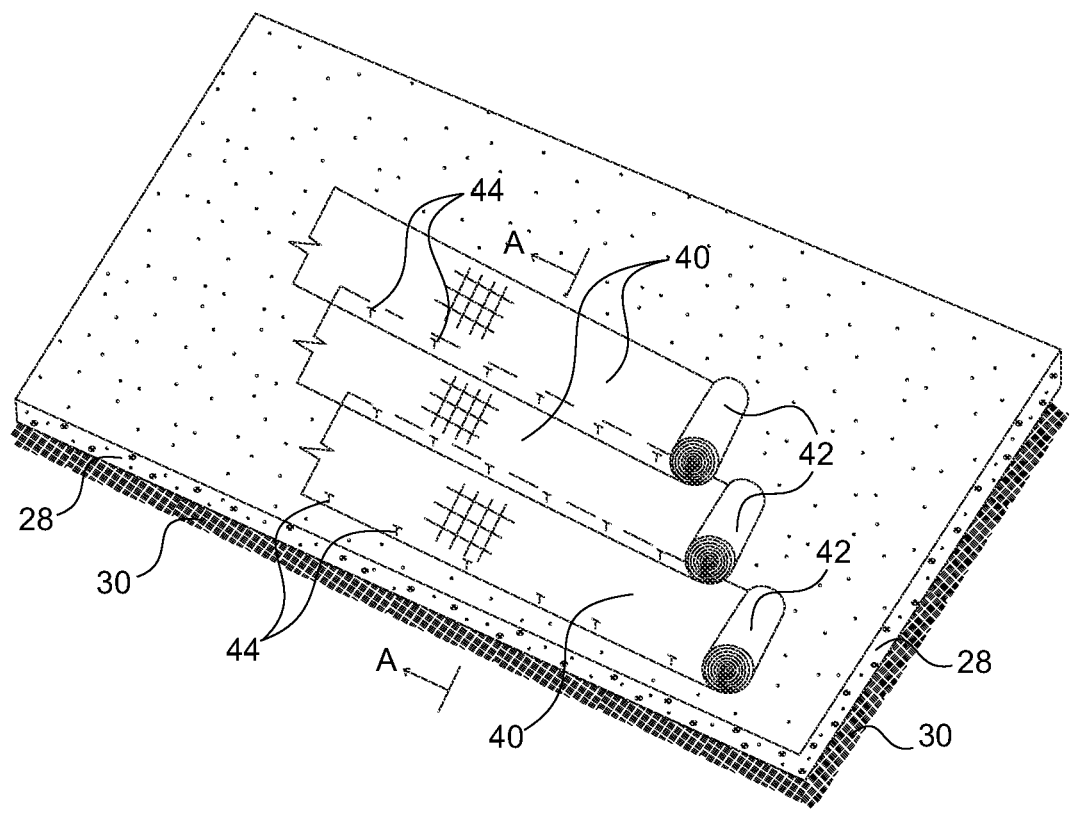
FIG. 6 is an illustrative view depicting the anchoring of the plurality of overlapping strips of the eco-friendly netting on the topsoil bed in the exemplary sod growing method.
Figure 7:
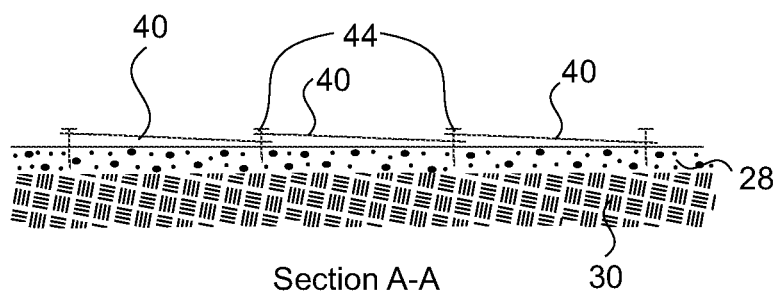
FIG. 7 is a sectional view further illustrating the anchoring of the plurality of overlapping strips of the eco-friendly netting in FIG. 6, wherein the sectional view is generally cut along the cutting-plane line A-A in FIG. 6.
Figure 8:
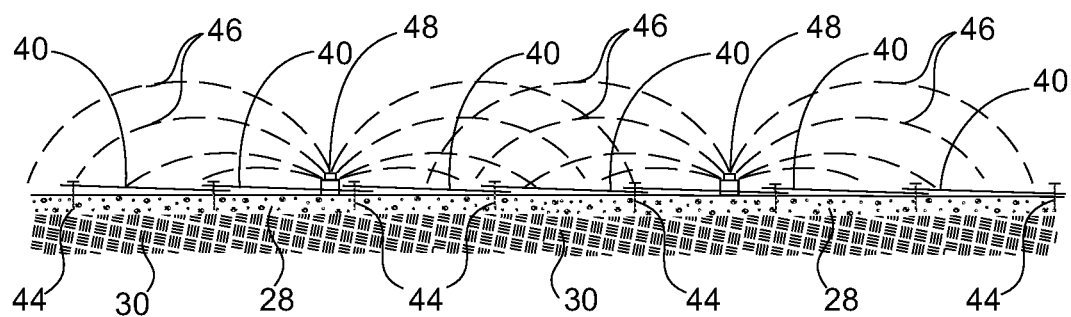
FIG. 8 is an illustrative view depicting the irrigation of the plurality of seeds in the topsoil bed in the exemplary sod growing method.

Now, a first exemplary application for the eco-friendly netting 10 will be described. In particular, the eco-friendly netting 10 is particularly useful for growing sod. Initially, with reference to FIG. 3, in the sod growing process, a top portion of a topsoil bed 28 is loosened in order to prepare the topsoil bed 28 for a planting of seeds (e.g., by a person 34 loosening the topsoil bed 28 with a rake 32). For example, the upper two (2) to three (3) inches of the topsoil 28 is loosened to prepare the seed bed. As an alternative to using to the illustrated rake 32, the top portion of a topsoil bed 28 may be loosened using a tiller or another suitable device. The lower soil layers 30, which are disposed underneath the topsoil bed 28, are not required to be loosened. Also, any weeds, clods, wood, or other obstructions that may interfere with the installation of the netting 10 are removed. Then, as shown in FIG. 4, a plurality of seeds 36 is applied to the topsoil bed 28 (e.g., by using a seed spreader 38) such that the plurality of seeds 36 are embedded in the topsoil bed 28 (e.g., a machine, such as a roller, may be used to embed the seeds into the topsoil bed after the seeding thereof). The use of a roller ensures that a majority of the seeds 36 have good seed-to-soil contact. After which, turning to FIG. 5, a plurality of strips 40 of the eco-friendly netting 10 are unrolled from netting rolls 42, and are arranged on a top of the topsoil bed 28 in an overlapping manner. For example, each of the plurality of strips 40 of the eco-friendly netting 10 in FIG. 5 may be overlapped side-to-side a minimum of six (6) inches in a shingle-style manner with the upper layer pointing in the direction of the prevailing wind. Also, the strips 40 of the eco-friendly netting 10 in FIG. 5 may be overlapped end-to-end a minimum of six (6) inches in a shingle-style manner with the upper layer pointing in the direction of the prevailing wind. In one exemplary embodiment, the eco-friendly netting 10 may be unrolled from the netting rolls 42 using a fieldnet installer device that may be attached to a tractor. In an alternative exemplary embodiment, the eco-friendly netting 10 may be manually unrolled from the netting rolls 42 by a person. Following the placement of each of the netting strips 40, one or more outer edges of each placed netting strip 40 are anchored into the ground using anchors 44 so as to retain the eco-friendly netting 10 in place (refer to FIGS. 6 and 7). That is, in one or more embodiments, the anchors 44 for a particular netting strip 40 may be installed after that particular netting strip 40 is placed on the topsoil bed 28 such that the netting strips 40 are generally anchored one at a time as they are positioned on the topsoil bed 28. For example, the outer edges of the plurality of the netting strips 40 may be anchored into the ground by using anchors about six (6) feet on center parallel to the longitudinal edge of netting, and about three (3) inches from either of the edges. In most cases, there is no need to place anchors in the mid-section area of the netting. Also, at the end of each roll, anchors may be installed approximately three (3) feet on center, and approximately three (3) inches from the edge parallel to the transverse edge of the roll. After installing the eco-friendly netting 10 on the topsoil bed 28, the sod growing process may include the further step of applying a veneer of soil. After which, the plurality of seeds 36 in the topsoil bed 28 is irrigated (e.g., by using an irrigation system with a plurality of sprinkler heads 48 that distribute streams of water 46—see FIG. 8) so that grass 50 grows in the topsoil bed 28 and roots 52 of the grass 50 intertwine with the plurality of fibers or yarns of the strips 40 of the eco-friendly netting 10. That is, the netting 10 enables grass seedlings of the sod to germinate and grow, while their root systems 52 intertwine with the fibers or yarns of the netting 10, thereby producing a sturdy foundation for an earlier harvest. The netting 10 becomes a reinforcing grid around which the roots 52 will grow and intertwine to form an integrated system. Finally, once the grass develops into a mature state (e.g., as shown in FIG. 9), the sod is harvested and ready for use. Advantageously, as a result of utilizing the netting 10 in the sod growing process, once the grass is mature, the sod can be harvested immediately saving time and allowing up to twice as much sod to be produced in the same amount of space. The end result is a more efficient and higher production with reduced growing time. Also, because the root systems of the grass seedlings intertwine with the netting 10 as they grow, a stronger foundation is provided, thereby resulting in an earlier harvest. The eco-friendly netting 10 will eventually biodegrade and release soil nutrients after its functional life.

If required, the sod growing process may also include the further step of applying at least one of fertilizers, soil amendments, and herbicides to the plurality of seeds in the topsoil bed. The sod growing process may also include the additional step of mowing the sod when the grass reaches a predetermined height (e.g., a height of approximately three (3) to four (4) inches).

Figure 10:
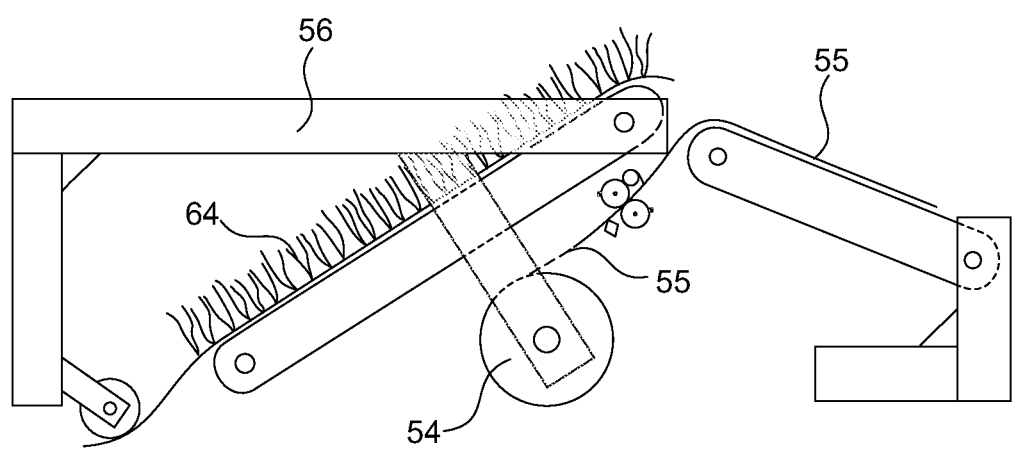
FIG. 10 is an illustrative view depicting the installation of a roll of eco-friendly netting in a mechanical harvester in an exemplary sod harvesting method which utilizes the eco-friendly netting described herein.
Figure 11:
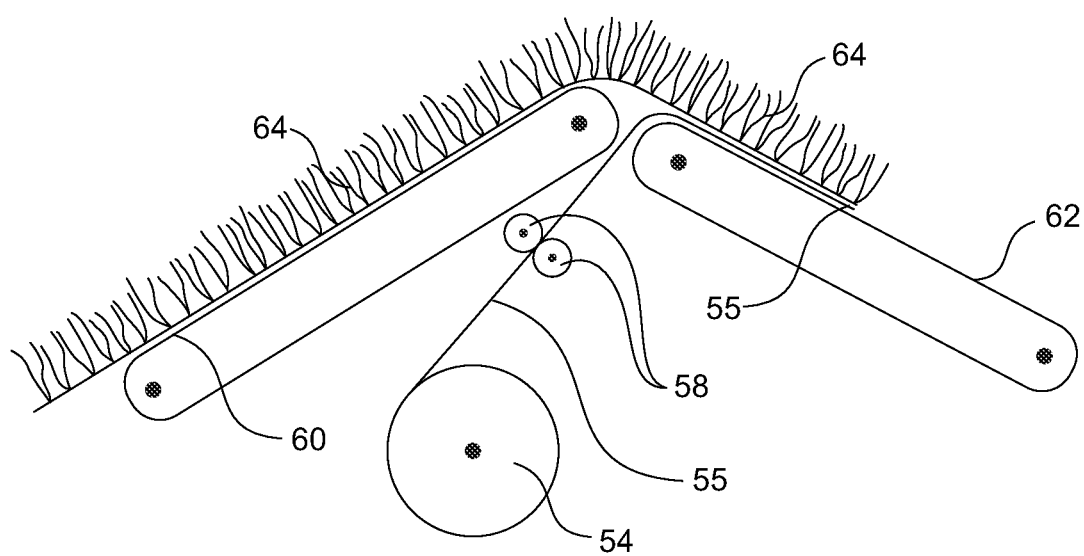
FIG. 11 is an illustrative view depicting the dispensing of the eco-friendly netting from its roll, and the supporting of the sod using the dispensed netting in the exemplary sod harvesting method.
Figure 12:
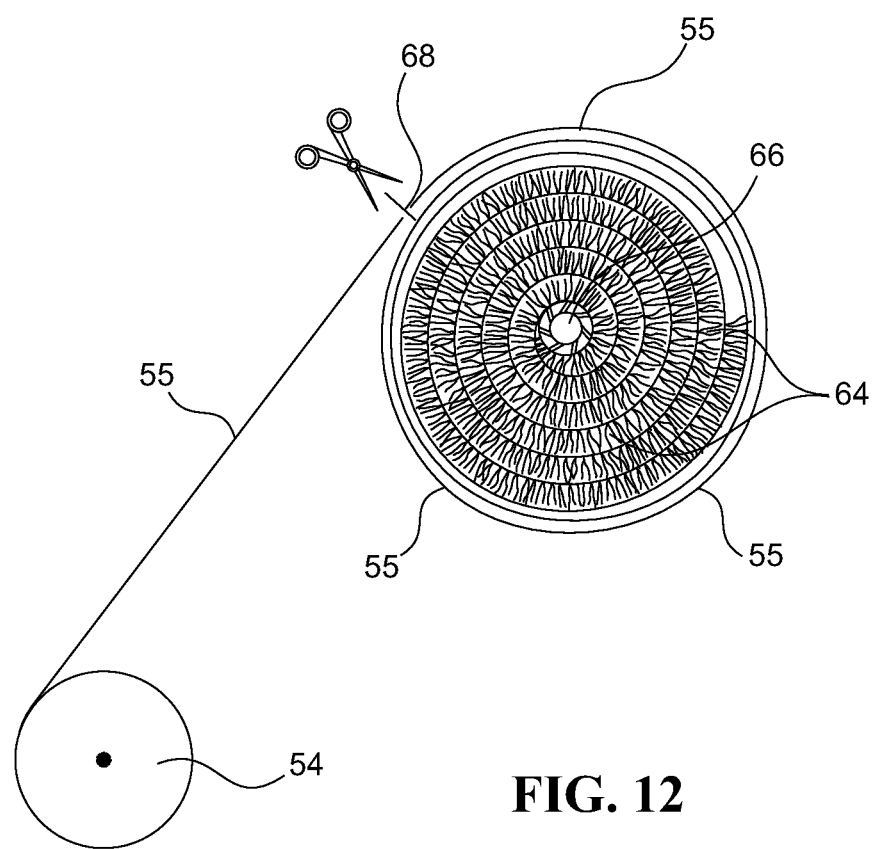
FIG. 12 is an illustrative view depicting the wrapping of a sod roll using the eco-friendly netting, and the cutting of the netting after the sod roll has been wrapped in the exemplary sod harvesting method.

Next, a second exemplary application for the eco-friendly netting 10 will be explained. In particular, the eco-friendly netting 10 is also particularly useful for harvesting sod. Initially, with reference to FIG. 10, in the sod harvesting process, a roll 54 of the eco-friendly netting 10 is installed in a mechanical harvester 56. Next, turning to FIG. 11, the harvester cuts and extracts the sod 64, and places the sod 64 onto its conveyor belts 60, 62. Then, with continued reference to FIG. 11, the eco-friendly netting 10 is dispensed from the roll 54, the unrolled portion 55 of the netting 10 is guided by means of rollers 58 on the mechanical harvester, and the underside of the sod 64 extracted and cut by the mechanical harvester is supported using the unrolled portion 55 of the eco-friendly netting 10 prior to the sod 64 being wound onto a core. After which, as shown in FIG. 12, when a sod roll thus formed by the winding of the sod 64 onto the core 66 (e.g., a polyvinyl chloride (PVC) or cardboard core) reaches a predetermined diameter (e.g., as shown in FIG. 12), the sod 64 is cut, and the unrolled portion 55 of the eco-friendly netting 10 is wrapped around the sod roll a predetermined number of times (e.g., as shown in FIG. 12) so as to secure the sod roll. Finally, referring again to FIG. 12, the unrolled portion 55 of the eco-friendly netting 10 is cut with a cutting device (e.g., blade 68 on the harvester, or other type of manual cutting device). In one embodiment, only the outer layer of the sod roll is wrapped with the eco-friendly netting 10, while in an alternative embodiment, a layer of the netting 10 is placed under substantially the entire length, or the entire length of the cut sod, and then the netting and sod layers are rolled into a single large sod roll.

When a plurality of sod rolls are being harvested, the steps of dispensing the netting, supporting the sod using the netting, winding the sod around a core, cutting the sod roll, wrapping the netting around the sod roll, and cutting the netting are repeated for each of the plurality of sod rolls. Also, when one roll 54 of the netting 10 is finished, another roll 54 may be installed in the harvester, and the steps described above may be repeated. In one or more embodiments, when the eco-friendly netting 10 is used for the above described sod harvesting application, it may have a different mesh opening size and mass per unit area as compared to the netting used for growing sod.

Figure 20:
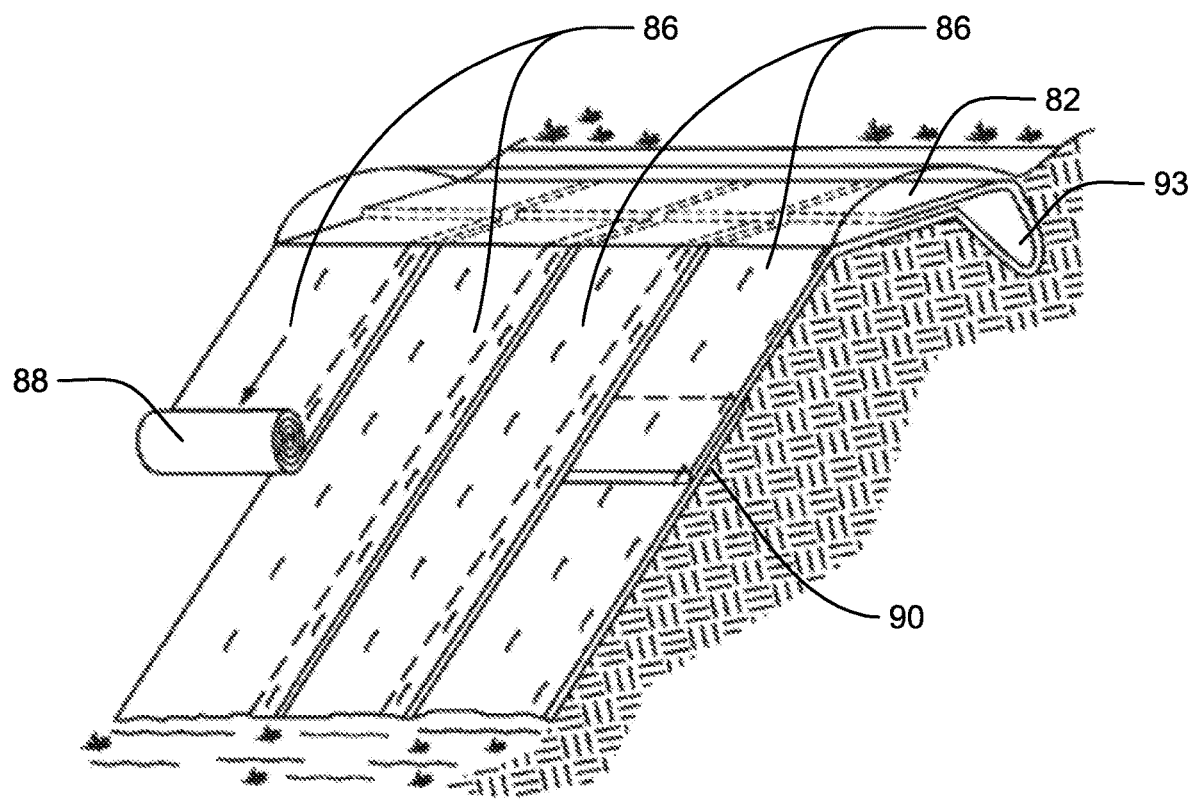
FIG. 20 is an illustrative view depicting the placement of a plurality of overlapping strips of the erosion control blanket of FIG. 16 on a sloped surface in an exemplary soil erosion control method.
Figure 21:
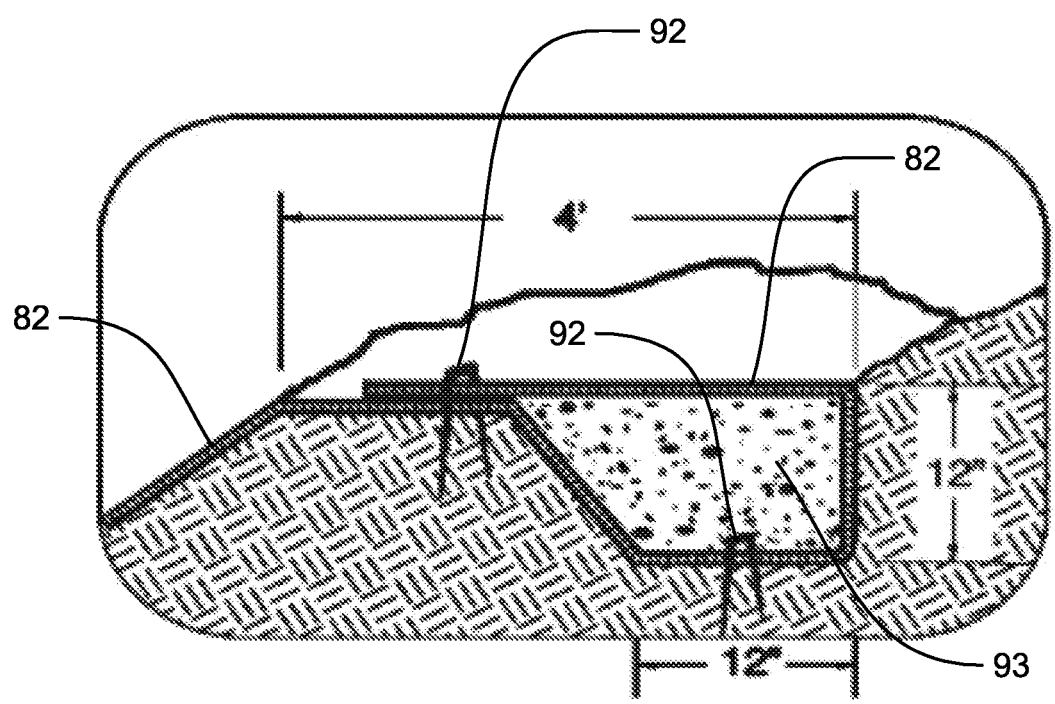
FIG. 21 is an illustrative view depicting an initial anchor trench for the installation of the plurality of overlapping strips of the erosion control blanket on the sloped surface of FIG. 20.

Now, a third exemplary application for the eco-friendly netting 10 will be explained. In particular, the eco-friendly netting 10 is also particularly useful for soil erosion control. Initially, in the soil erosion control process, a top portion of a topsoil bed 28 is loosened in order to prepare the topsoil bed 28 for a planting of seeds (e.g., by a person 34 loosening the topsoil bed 28 with a rake 32—see FIG. 3). For example, the upper two (2) to three (3) inches of the topsoil 28 is loosened to prepare the seed bed. As an alternative to using to the illustrated rake 32, the top portion of a topsoil bed 28 may be loosened using a tiller or another suitable device. The lower soil layers 30, which are disposed underneath the topsoil bed 28, are not required to be loosened. Also, any weeds, clods, wood, or other obstructions that may interfere with the installation of the erosion control blanket 82, which includes the netting 10, are removed. Then, a plurality of seeds 36 is applied to the topsoil bed 28 (e.g., by using a seed spreader 38—see FIG. 4) such that the plurality of seeds 36 are embedded in the topsoil bed 28 (e.g., a machine, such as a roller, may be used to embed the seeds into the topsoil bed after the seeding thereof). The use of a roller ensures that a majority of the seeds 36 have good seed-to-soil contact. Then, referring collectively to FIGS. 20 and 21, for installation on a sloped surface 90, one or more erosion control blankets 82 are initially anchored at the top of the slope using an initial anchor trench 93 (e.g., a 12" deep by 12" wide anchor trench 93—see FIG. 21) with anchors (e.g., U-shaped metal staples 92) extending through the blanket 82 and into the ground. Rather, than U-shaped metal staples 92, wooden stakes may also be used to anchor the one or more erosion control blankets 82. After which, turning to FIG. 20, a plurality of strips 86 of the erosion control blanket 82 are unrolled from blanket rolls 88 down the slope in the direction of water flow, and are arranged on a top of the soil area in an overlapping manner. For example, each of the plurality of strips 86 of the erosion control blanket 82 in FIG. 20 may be overlapped side-to-side a minimum of six (6) inches in a shingle-style manner. Next, for installation on the sloped surface 90, the ends of the one or more erosion control blankets 82 are anchored, filled, and compacted in a terminal anchor trench (e.g., a 12" deep by 6" wide anchor trench). After installing the one or more erosion control blankets 82 on the sloped surface 90, the soil erosion control process may include the further step of applying a veneer of soil.

After which, the plurality of seeds on the sloped surface 90 is irrigated (e.g., by using an irrigation system or one or more surface sprinklers) so that vegetation grows in the soil area.

If required, the soil erosion control process may also include the further step of applying at least one of fertilizers, soil amendments, and herbicides to the plurality of seeds in the soil area.

Figure 22:
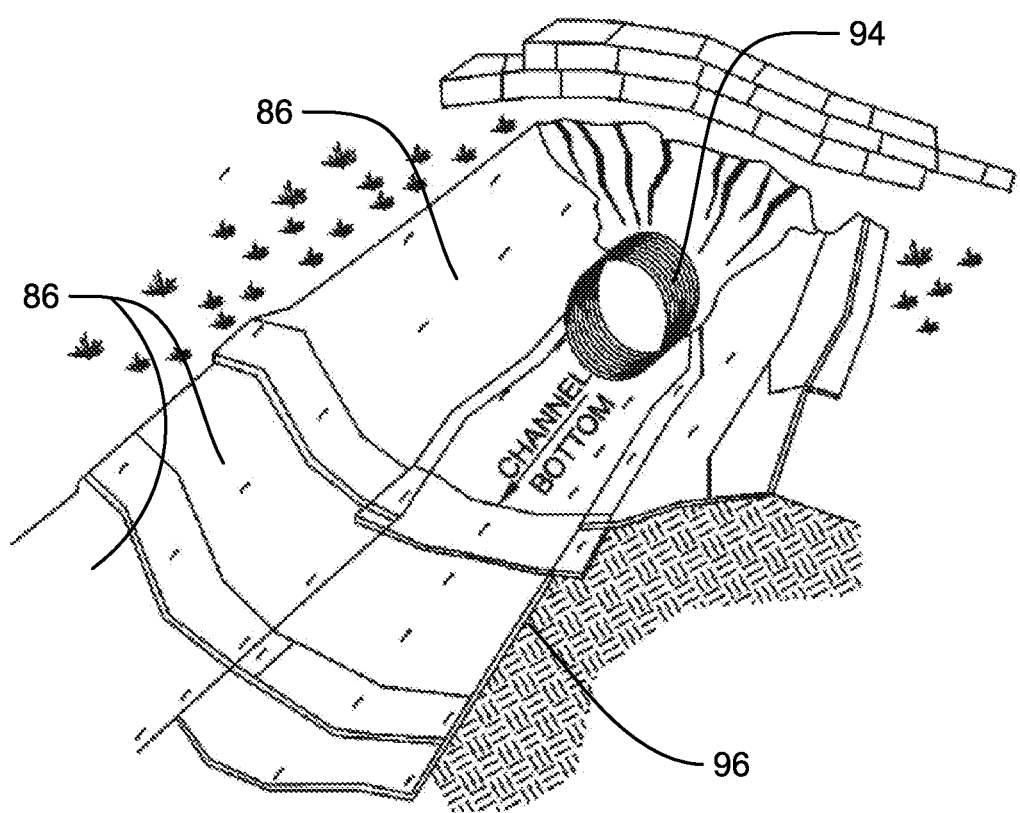
FIG. 22 is an illustrative view depicting the placement of a plurality of overlapping strips of the erosion control blanket of FIG. 16 on surfaces of a channel in another exemplary soil erosion control method.
Figure 23:
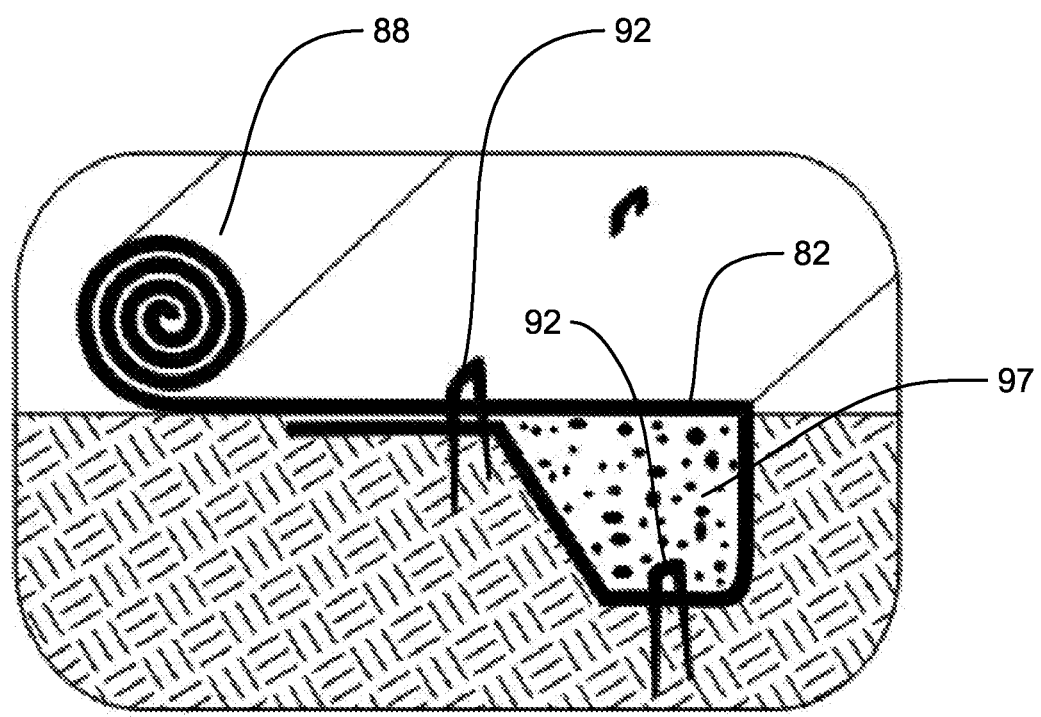
FIG. 23 is an illustrative view depicting an initial anchor trench for the installation of the plurality of overlapping strips of the erosion control blanket on the surfaces of the channel in FIG. 22.

Now, with reference collectively to FIGS. 22 and 23, an alternative installation of erosion control blankets 82 on the surfaces of a channel 96 will be described. Similar to the sloped surface installation described above, at the upstream end of the channel 96, near a culvert 94 (or in a channel without a culvert), the erosion control blankets 82 are anchored using an initial anchor trench 97 (e.g., a 12" deep by 12" wide anchor trench 97—see FIG. 23) with anchors (e.g., U-shaped metal staples 92) extending through the blanket 82 and into the ground. Rather, than U-shaped metal staples 92, wooden stakes may also be used to anchor the strips 86 of the erosion control blanket 82. After which, turning to FIG. 22, a plurality of strips 86 of the erosion control blanket 82 are unrolled from blanket rolls downstream in the direction of water flow, and are arranged on a top of the trench 96 in an overlapping manner. For example, each of the plurality of strips 86 of the erosion control blanket 82 in FIG. 22 may be overlapped side-to-side a minimum of eight (8) inches in a shingle-style manner. In addition, for the trench installation, the strips 86 of erosion control blanket 82 may be further anchored using intermittent check slots, longitudinal anchor trenches, and a terminal anchor trench.

It is readily apparent that the eco-friendly netting 10 described herein offers numerous advantages. First, the eco-friendly netting 10 offers an eco-friendly alternative to traditional plastic turf netting for soil erosion control, sod growers, and harvesters that does not have the negative environmental impacts of conventional plastic netting. Secondly, the eco-friendly netting 10 significantly reduces the chances of netting entanglement in grass mowing equipment and the threat of wildlife entrapment by its unique structure and composition. In addition, the eco-friendly netting is heavier than conventional plastic netting so as to greatly reduce the likelihood that the netting will be displaced by natural forces acting thereon, such as that of wind-induced forces. The structure of the netting 10 helps to provide a windproof installation, saving time and money. Finally, the eco-friendly netting 10 described herein is particularly well-suited for growth support or root reinforcement, and for structural backing and/or sod roll layer separation during sod harvesting. Because of the unique structure of the netting 10, the netting 10 is capable of being laid more smoothly and requires less labor to install. The netting 10 increases crop turnover and produces an earlier harvest with higher annual yields, thereby resulting in higher profits. Also, because the eco-friendly netting is derived from renewable resources which are natural, biodegradable, and organic, the carbon foot print is minimal. After its functional life, the eco-friendly netting will biodegrade, releasing soil nutrients back to nature.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An eco-friendly netting for soil erosion control, said eco-friendly netting comprising:
  a netting body portion forming a pattern of netting apertures, said netting body portion being formed from a material that is at least partially biodegradable, at least one of said netting apertures having an opening size of at least 8.0 millimeters by at least 8.0 millimeters;
  wherein said netting is provided as part of an erosion control blanket, said erosion control blanket further comprising a layer of another material that is attached to said netting, said layer of another material of said erosion control blanket being selected from the group consisting of: (i) straw, (ii) coir, (iii) polypropylene, (iv) hemp, (v) jute, (vi) any natural fiber, (vii) any synthetic fiber, and (viii) any combinations thereof.

2. The eco-friendly netting according to claim 1, wherein said netting is provided on one side of said layer of another material.

3. The eco-friendly netting according to claim 1, wherein said netting is provided above and below said layer of another material so as to form both a bottom layer and a top layer of said erosion control blanket with said layer of another material forming a central layer sandwiched between said top and bottom layers.

4. The eco-friendly netting according to claim 1, wherein said layer of another material is attached to said netting by at least one of: (i) stitch-bonding, (ii) needle felting, (iii) gluing, and (iv) combinations thereof.

5. The eco-friendly netting according to claim 1, wherein said material forming said netting body portion is configured to decompose without requiring exposure to ultraviolet radiation.

6. The eco-friendly netting according to claim 1, wherein said material forming said netting body portion is configured to absorb water so as to increase a weight of said material and release the absorbed water back to a root system in adjacent soil.

7. The eco-friendly netting according to claim 1, wherein said material forming said netting body portion is configured to release nutrients to the soil as said material decomposes.

8. The eco-friendly netting according to claim 1, wherein said material forming said netting body portion is selected from the group consisting of: (i) one or more plant-based fibers, (ii) one or more agricultural by-products, (iii) one or more organic materials, (iv) one or more inorganic materials, (v) one or more bioplastics, and (vi) combinations thereof.

9. The eco-friendly netting according to claim 1, wherein said material forming said netting body portion comprises a plurality of fibers or yarns arranged in a woven configuration, a knitted configuration, a substantially non-woven configuration, or an extruded configuration, and each of said plurality of fibers or yarns is formed from a substantially natural or biodegradable material.

10. The eco-friendly netting according to claim 9, wherein said substantially natural or biodegradable material comprises jute, hemp, coir, cotton and/or bioplastics.

11. The eco-friendly netting according to claim 1, wherein said netting has a mass per unit area of less than 300 grams per square meter.

12. The eco-friendly netting according to claim 1, wherein said netting apertures are formed in said netting body portion by: (i) weaving, (ii) knitting, (iii) needle-punching, or (iv) extrusion, and each of said netting apertures has an opening size of at least 0.8 millimeters by at least 0.8 millimeters.

13. The eco-friendly netting according to claim 1, wherein said netting is treated or processed to increase a functional longevity of said netting, and said netting has a longevity of between approximately 3 months and approximately 60 months, inclusive.

14. The eco-friendly netting according to claim 1, wherein said netting has a longitudinal wide width strip tensile strength of less than 2500 pounds per foot, and said netting has a transversal wide width strip tensile strength of less than 2500 pounds per foot.

15. The eco-friendly netting according to claim 1, wherein said netting is pre-seeded.

16. The eco-friendly netting according to claim 1, wherein said netting is treated or processed with at least one of anti-rot agents, degrading accelerators, degrading inhibitors, nutrients, pesticides, fungicides, algaecides, herbicides, water absorption enhancers, water retention enhancers, water repellent enhancers, or any combination thereof.

17. A soil erosion control method using an eco-friendly netting, said method comprising the steps of:
(i) providing an erosion control blanket that includes an eco-friendly netting, said eco-friendly netting including:
a netting body portion forming a pattern of netting apertures, said netting body portion being formed from a material that is at least partially biodegradable, at least one of said netting apertures having an opening size of at least 8.0 millimeters by at least 8.0 millimeters; and
wherein said erosion control blanket further comprises a layer of another material that is attached to said netting, said layer of another material of said erosion control blanket being selected from the group consisting of: (i) straw, (ii) coir, (iii) polypropylene, (iv) hemp, (v) jute, (vi) any natural fiber, (vii) any synthetic fiber, and (viii) any combinations thereof;
(ii) loosening a top portion of a soil area to prepare said soil area for a planting of seeds;
(iii) applying a plurality of seeds to said soil area such that said plurality of seeds are embedded in said soil area;
(iv) unrolling and arranging a plurality of strips of said erosion control blanket on a top of said soil area in an overlapping manner;
(v) anchoring a plurality of outer edges of said plurality of said erosion control blanket strips into the ground so as to retain said erosion control blanket in place; and
(vi) irrigating said plurality of seeds in said soil area so that vegetation grows in said soil area.

18. The method according to claim 17, further comprising the step of:
(vii) applying at least one of additional seeding, irrigation, fertilizers, soil amendments, and herbicides to said plurality of seeds in said soil area.

* * * * *